(12) United States Patent
Wang et al.

(10) Patent No.: US 12,175,609 B2
(45) Date of Patent: Dec. 24, 2024

(54) LIVE ROOM PRESENTATION METHOD AND APPARATUS

(71) Applicant: SHANGHAI BILIBILI TECHNOLOGY CO., LTD., Shanghai (CN)

(72) Inventors: Yao Wang, Shanghai (CN); Min Ye, Shanghai (CN); Huaizhou Zhang, Shanghai (CN); Junyuan Yang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 64 days.

(21) Appl. No.: 17/992,139

(22) Filed: Nov. 22, 2022

(65) Prior Publication Data
US 2023/0162451 A1 May 25, 2023

(30) Foreign Application Priority Data
Nov. 24, 2021 (CN) .......................... 202111407483.3

(51) Int. Cl.
G06T 19/00 (2011.01)
A63F 13/86 (2014.01)
(Continued)

(52) U.S. Cl.
CPC ............ *G06T 19/006* (2013.01); *A63F 13/86* (2014.09); *G06T 13/40* (2013.01); *H04N 21/2187* (2013.01); *G06T 2219/024* (2013.01)

(58) Field of Classification Search
CPC ......... G06T 19/006; G06T 13/40; A63F 13/86
See application file for complete search history.

(56) References Cited

U.S. PATENT DOCUMENTS 9,563,723 B1 * 2/2017 Breed ..................... G06F 30/20
2012/0131478 A1 * 5/2012 Maor ..................... G06T 19/20
715/757
(Continued)

FOREIGN PATENT DOCUMENTS

CN 106937154 A 7/2017
CN 109874021 A 6/2019
(Continued)

Primary Examiner — Yi Yang
(74) Attorney, Agent, or Firm — BakerHostetler

(57) ABSTRACT

This application provides techniques for a live room presentation. The techniques comprise: receiving a live room entry instruction by an audience client computing device associated with a user; determining target avatar information associated with the user and a target live room based on the instruction; establishing a transmission connection between the audience client computing device and the target live room in a server to facilitate subsequent transmission of live data; obtaining virtual scene information and virtual audience information associated with the target live room; determining location information of each avatar corresponding to each user associated with the target live room in a virtual scene based on the target avatar information and the virtual audience information; and rendering and presenting the target live room based on the location information of each avatar in the virtual scene and the virtual scene information.

20 Claims, 5 Drawing Sheets

(51) Int. Cl.
*G06T 13/40* (2011.01)
*H04N 21/2187* (2011.01)

(56) References Cited

U.S. PATENT DOCUMENTS

| | | | |
|---|---|---|---|
| 2012/0224024 A1 | 9/2012 | Lueth et al. | |
| 2016/0321841 A1* | 11/2016 | Christen | G02B 27/017 |
| 2019/0147367 A1* | 5/2019 | Bellamy | G06N 20/00 |
| | | | 706/12 |
| 2019/0366213 A1* | 12/2019 | Zhou | A63F 13/533 |
| 2021/0319408 A1* | 10/2021 | Jorasch | H04L 12/1827 |

FOREIGN PATENT DOCUMENTS

| | | |
|---|---|---|
| CN | 110446092 A | 11/2019 |
| CN | 110493642 A | 11/2019 |
| CN | 111641842 A | 9/2020 |
| CN | 111641843 A | 9/2020 |
| CN | 113286186 A | 8/2021 |

* cited by examiner

LIVE ROOM PRESENTATION METHOD AND APPARATUS

CROSS-REFERENCE TO RELATED APPLICATIONS

This application claims priority to Chinese Patent Application No. 202111407483.3, filed on Nov. 24, 2021, and entitled "LIVE ROOM PRESENTATION METHOD AND APPARATUS", which is incorporated herein by reference in its entirety.

BACKGROUND

Because many offline activities cannot be implemented due to various uncontrollable factors, in this case, requirements for online interaction continuously increase. For example, in current online livestreaming, an online streamer can interact, for example, perform communication, with an audience in a live room by using a bullet-screen comment sent by a user in real time.

SUMMARY

In view of this, embodiments of this application provide a live room presentation method. This application also relates to a live room presentation apparatus, a computing device, and a computer-readable storage medium, to resolve problems in the conventional technology, such as an online streamer and an audience interact with each other in a single manner.

According to a first aspect of embodiments of this application, a live room presentation method is provided. The method is applied to an audience client, and includes:

- receiving a live room entry instruction sent by a user, and determining a target live room and target avatar information of the user based on the live room entry instruction, where the target live room is in a virtual audience mode;
- obtaining virtual scene information and virtual audience information of the target live room;
- determining location information of each avatar in a virtual scene based on the target avatar information and the virtual audience information; and
- rendering and presenting the target live room based on the location information of each avatar in the virtual scene and the virtual scene information.

According to a second aspect of embodiments of this application, a live room presentation method is provided. The method is applied to a live room presentation system, and includes:

An audience client computing device (i.e., audience client) receives a live room entry instruction sent by a user, determines a target live room and target avatar information of the user in the target live room based on a live room identifier carried in the live room entry instruction, and sends a live room information obtaining instruction to a server computing device (i.e., server), where the target live room is in a virtual audience mode;

the server receives the live room information obtaining instruction, determines virtual scene information and virtual audience information of the target live room based on the live room information obtaining instruction, and returns the virtual scene information and the virtual audience information to the audience client; and the audience client determines location information of each avatar in a virtual scene based on the virtual audience information and the target avatar information, and renders and presents the target live room based on the location information of each avatar in the virtual scene and the virtual scene information.

According to a third aspect of embodiments of this application, a live room presentation apparatus is provided. The apparatus includes:

- a receiving module, configured to: receive a live room entry instruction sent by a user, and determine a target live room and target avatar information of the user based on the live room entry instruction, where the target live room is in a virtual audience mode;
- an obtaining module, configured to obtain virtual scene information and virtual audience information of the target live room;
- a determining module, configured to determine location information of each avatar in a virtual scene based on the target avatar information and the virtual audience information; and
- a presentation module, configured to render and present the target live room based on the location information of each avatar in the virtual scene and the virtual scene information.

According to a fourth aspect of embodiments of this application, a live room presentation apparatus is provided. The apparatus is applied to a live room presentation system, and includes:

- an audience client, configured to: receive a live room entry instruction sent by a user, determine a target live room and target avatar information of the user in the target live room based on a live room identifier carried in the live room entry instruction, and send a live room information obtaining instruction to a server, where the target live room is in a virtual audience mode; and
- a server, configured to: receive the live room information obtaining instruction, determine virtual scene information and virtual audience information of the target live room based on the live room information obtaining instruction, and return the virtual scene information and the virtual audience information to the audience client.

The audience client is configured to: determine location information of each avatar in a virtual scene based on the virtual audience information and the target avatar information, and render and present the target live room based on the location information of each avatar in the virtual scene and the virtual scene information.

According to a fifth aspect of embodiments of this application, a computing device is provided. The computing device includes a memory, a processor, and computer instructions stored in the memory and capable of running on the processor, where when the processor executes the computer instructions, the steps of the live room presentation method are implemented.

According to a sixth aspect of embodiments of this application, a computer-readable storage medium is provided, where the computer-readable storage medium stores computer instructions, and when the computer instructions are executed by a processor, the steps of the live room presentation method are implemented.

According to the live room presentation method provided in this application, the live room entry instruction sent by the user is received, and the target live room and the target avatar information of the user are determined based on the live room entry instruction, where the target live room is in the virtual audience mode; the virtual scene information and the virtual audience information of the target live room are obtained; the location information of each avatar in the virtual scene is determined based on the target avatar information and the virtual audience information; and the target live room is rendered and presented based on the location information of each avatar in the virtual scene and the virtual scene information.

Embodiments of this application implement the following: The live room entry instruction sent by the user is received, and the target live room and the target avatar information of the user are determined based on the live room entry instruction, so that a transmission connection is established between the client and the target live room in the server. This facilitates subsequent efficient transmission of live data. The virtual scene information and the virtual audience information of the target live room are obtained, to determine a presentation case of the virtual scene of the current target live room. The location information of each avatar in the virtual scene is obtained based on the target avatar information and the virtual audience information, to determine how to present a virtual audience corresponding to each user in the target live room after a new audience is added. The target live room is rendered and presented based on the location information and the virtual scene information, so that an avatar corresponding to a user watching the target live room is presented in the virtual scene of the target live room.

DESCRIPTION OF EMBODIMENTS

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application refers to any or all possible combinations including one or more associated listed items.

It should be understood that although terms such as "first" and "second" can be used in one or more embodiments of this application to describe various types of information, the information is not limited to these terms. These terms are merely used to differentiate between information of a same type. For example, without departing from the scope of one or more embodiments of this application, "first" may also be referred to as "second", and similarly, "second" may also be referred to as "first". Depending on the context, for example, the word "if" used herein can be explained as "while", "when", or "determining in response to".

In a current online activity, there is a lack of a live scene similar to a concert, a competition, or the like. Consequently, a user cannot have a strong sense of immersion, which is quite different from an offline activity. In this application, an audience is enabled to experience a different virtual world through rich online interaction and blurring of a boundary between online interaction and on-site interaction. An interaction manner can be added for a live room by using a virtual online streamer or some specific live scenes, such as a concert or a competition, to simulate a real scene mode of an environment, add a virtual audience, and add a special effect prop, thereby improving user experience.

In this application, a live room presentation method is provided. This application also relates to a live room presentation apparatus, a computing device, and a computer-readable storage medium. Details are described one by one in the following embodiments.

Figure 1:
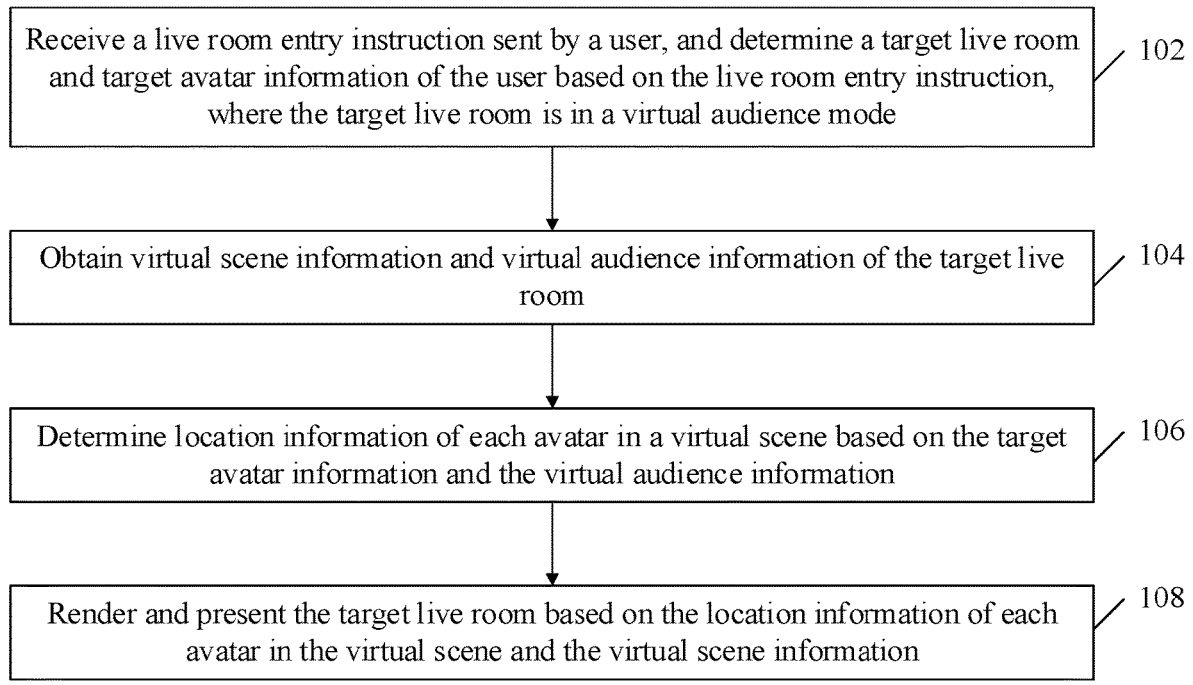
FIG. 1 is a flowchart of a first live room presentation method according to an embodiment of this application.

FIG. 1 is a flowchart of a first live room presentation method according to an embodiment of this application. The method is applied to an audience client and specifically includes the following steps:

Step 102: Receive a live room entry instruction sent by a user, and determine a target live room and target avatar information of the user based on the live room entry instruction, where the target live room is in a virtual audience mode.

The user that wants to watch livestreaming can select, from a live room list, a live room in which a virtual audience mode is enabled for watching, where the virtual audience mode refers to that a corresponding live avatar is allocated for each user entering the live room. After the user enters the live room, an avatar of the user can be presented in a virtual scene of the live room, so that a boundary between an online activity and an offline activity is blurred when the user watches livestreaming, thereby bringing a better immersion effect to the user. The live room is a chat room implemented by using a computer technology. Usually, the live room has audio and video play and control functions. The live room includes an online streamer user and an audience user. The online streamer user and the audience user can implement interaction in an interaction manner, for example, by using voice, a video, or a text. In addition, the live room can be used in any scene that needs the similar interaction, for example, in an online meeting, an online concert, or an online course. The virtual scene is a scene in which an avatar corresponding to an audience and an avatar corresponding to an online streamer in the live room are presented. For example, the virtual scene may be a pre-constructed 3D stage model.

The client generates the live room entry instruction in response to an action that the user triggers the live room for presentation. The target live room can be determined based on the live room entry instruction, where the target live room is a live room that is selected by the user and that is in the virtual audience mode. After the target live room is determined, the target avatar information of the user in the target live room is obtained, where the target avatar information is information used to present the avatar corresponding to the user in the virtual scene corresponding to the live room.

Specifically, a method for determining the target live room and the target avatar information of the user based on the live room entry instruction includes:

obtaining a live room identifier carried in the live room entry instruction, and determining the target live room based on the live room identifier; and obtaining the target avatar information of the user in the target live room.

The live room identifier may be a field that uniquely identifies the target live room. For example, a live room identifier of a game live room is "game 1". The live room entry instruction sent by the user includes the live room identifier, and the target live room that the user determines to watch can be determined in the live room list of the client based on the live room identifier.

The target avatar information of the user in the target live room is determined based on the live room identifier, where the target avatar information may be obtained from the client or may be obtained from a server. A case in which the target avatar information is obtained from the client may be that the user once entered the target live room before entering the target live room this time, and the target avatar information corresponding to the user has been cached locally to the client, so that the target avatar information can be obtained from the client. A case in which the target avatar information is obtained from the server is that it is determined, based on the live room identifier in the live room entry instruction, that a live room database including data of the target live room is stored in the server, and the target avatar information is obtained from the live room database.

In an actual application, to improve user experience and to present different audiences in the virtual scene corresponding to the live room with different avatars, a method for obtaining the target avatar information of the user in the target live room may include:

obtaining initial avatar information of the user;

receiving an avatar information adjustment instruction for the initial avatar information; and adjusting the initial avatar information based on the avatar information adjustment instruction to obtain the target avatar information, where the target avatar information includes a plurality of pieces of body image information.

The initial avatar information is unadjusted avatar information. The unadjusted avatar information may be preset by the online streamer of the target live room, may be preset by a live platform, may be randomly allocated by a system for the user, or may be allocated based on attribute information of the user, where the attribute information of the user may be a membership level, interaction activeness, and the like of the user.

The avatar information adjustment instruction is an instruction for adjusting the initial avatar information. The target avatar information is avatar information obtained by adjusting the initial avatar information. The target avatar information may include but is not limited to head information, hand information, and trunk information. The target avatar information is divided into several pieces of body information, to subsequently change an action of the avatar. For example, a head of a virtual object may swing left and right, a hand may swing up and down, and a body may twist left and right.

Specifically, the avatar information adjustment instruction is generated based on an adjustment requirement of the user on the initial avatar information, and the initial avatar information is adjusted based on the avatar information adjustment instruction. The adjustment includes but is not limited to an adjustment on clothing of an initial avatar, an adjustment on a body action, and an adjustment on a character model. For example, the clothing of the initial avatar is changed from blue to gray, a hat accessory is added, and a facial expression is customized. After the initial avatar information is adjusted based on the avatar information adjustment instruction, the target avatar information is obtained.

In an actual application, in a livestreaming process, the avatar information adjustment instruction may be received to adjust the target avatar information, that is, in the livestreaming process, the user can adjust the avatar corresponding to the user at any time. This enriches a selection of the user and improves user participation.

In a specific implementation of this application, a puppy avatar is used as an example. It is obtained that the target avatar information that is of the user in the target live room and that is obtained based on the live room identifier is a puppy avatar. An adjustment instruction of the user for the puppy avatar is received, where the adjustment instruction includes: adding an exclusive hat accessory of the target live room and modifying a body action into twisting left and right. After puppy avatar information is adjusted based on the adjustment instruction, the target avatar information is obtained, that is, adjusted puppy avatar information.

The target live room can be determined based on the live room entry instruction, to further determine the target avatar information of the user in the target live room. This facilitates subsequent presentation of the avatar of the user in the virtual scene corresponding to the live room.

Step 104: Obtain virtual scene information and virtual audience information of the target live room.

After the target live room is determined, current live room information of the target live room needs to be obtained, so that an avatar of a user who newly enters the live room is presented in the virtual scene. The current live room information may include the virtual scene information and the virtual audience information, where the virtual scene information is information about the virtual scene presented in the current target live room. Specifically, the virtual scene information may include virtual stage information, virtual background information, virtual environment information, virtual online streamer information, and the like. For example, virtual scene information of a concert live room includes virtual concert stage information and concert online streamer information. The virtual audience information is information about an avatar corresponding to an audience in the current target live room.

In an actual application, a solution for obtaining the virtual scene information and the virtual audience information of the target live room includes:

generating a live room information obtaining instruction based on the live room entry instruction, and sending the live room information obtaining instruction to the server; and receiving the virtual scene information and the virtual audience information that are of the target live room and that are returned by the server in response to the live room information obtaining instruction.

The live room information obtaining instruction is an instruction for obtaining information about the target live room. The client sends the live room information obtaining instruction to the server. The server determines, in response to the live room information obtaining instruction, the live room database that stores the information about the target live room, obtains the virtual scene information and the virtual audience information of the target live room from the live room database, and returns the virtual scene information and the virtual audience information to the client.

In a specific implementation of this application, a target live room A is used as an example. An entry instruction for entering the live room A is determined, a live room information obtaining instruction is generated based on a live room identifier carried in the live room entry instruction, and the live room information obtaining instruction is sent to the server. The server determines, based on the live room identifier, a database that stores information about the live room A, obtains virtual scene information and virtual audience information of the live room A from the database, and returns the virtual scene information and the virtual audience information to the client.

Step 106: Determine location information of each avatar in a virtual scene based on the target avatar information and the virtual audience information.

Each avatar is an avatar corresponding to each audience in the current target live room. For example, in a dancing live room, an avatar corresponding to a user A watching the dancing live room is a bear avatar. The location information of each image in the virtual scene is location information of an avatar corresponding to each audience in the virtual scene. For example, in a concert live room, location information of a user A that watches the concert live room and location information of a user B that watches the concert live room in a virtual concert scene are respectively: the third column in the first row and the second column in the third row.

In an actual application, a method for obtaining the location information of each avatar in the virtual scene based on the target avatar information and the virtual audience information includes:

determining a preset sorting rule; and obtaining the location information of each avatar in the virtual scene based on the preset sorting rule, the target avatar information, and the virtual audience information.

The preset sorting rule is a rule for sorting an avatar. For example, the preset sorting rule may be obtained based on a user level, a user nickname, or user activeness, or may be obtained by combining two or more sorting rules. For example, the preset sorting rule is obtained by combining two types of rules: a membership level and activeness. When membership levels of users are the same, the users can be further sorted based on activeness. The preset sorting rule may be preset by the online streamer of the target live room, and may be specifically based on an actual requirement.

In a specific implementation of this application, for example, the preset sorting rule is based on a user level. It is determined that a sorting rule for an avatar in a live room B is that sorting is performed based on a descending order of user levels. Location information of each avatar in a virtual scene is obtained based on target avatar information of a user entering the live room B, virtual audience information of the live room B, and the preset sorting rule.

In an actual application, the target avatar information includes target attribute information and target location information, and the virtual audience information includes audience attribute information and audience location information. A method for obtaining the location information of each avatar in the virtual scene based on the preset sorting rule, the target avatar information, and the virtual audience information specifically includes:

sorting the target location information and the audience location information based on the preset sorting rule, the target attribute information, and the audience attribute information, to obtain a location order table, where the location order table includes current target location information and current audience location information; and determining the location information of each avatar in the virtual scene based on the current target location information and the current audience location information, target image information, and audience image information.

The target avatar information further includes the target image information, used to present the target avatar in the live room. The target image information is appearance information of the target avatar. For example, color information and 3D model information of an avatar. The target attribute information is attribute information of an audience, for example, interaction activeness of the audience and a membership level of the audience. The target location information is initial location information when the target avatar is presented in the virtual scene. For example, if avatar information corresponding to an audience is that the audience is the fifth audience entering a live room, initial location information of the audience may be set to: the fifth column in the first row.

The virtual audience information further includes the audience image information, used to present an avatar corresponding to an audience in the target live room. The audience image information is appearance information of each virtual object in the current target live room. The audience attribute information is attribute information of each audience in the current live room. The audience location information is current location information of each avatar in the virtual scene.

The location information of each avatar is sorted based on the preset sorting rule and attribute information corresponding to each avatar, to obtain the location order table, where the location order table is a data table including image information of an avatar and location information corresponding to the image information. The current target location information is current location information that is of the target avatar presented in the virtual scene and that is obtained after the target avatar is sorted based on the preset sorting rule. The current audience location information is current location information that is of each avatar and that is obtained after the avatar is sorted based on the preset sorting rule.

In a specific implementation of this application, for example, a user 1 enters a live room C. A preset sorting rule is that sorting is performed based on a descending order of membership levels of audiences. The user 1 has a cat avatar, and cat avatar information includes: cat model information: a model 1; attribute information of the user 1: a membership level 3; and initial location information of the cat avatar: the first column in the fifth row. Virtual audience information of the live room C includes virtual audience information of each of an audience 1, an audience 2, . . . , and an audience n. Each piece of virtual audience information includes audience image information (a model 2, a model 5, . . . ), audience attribute information (a membership level 1, a membership level 4, . . . ), and audience location information (the first column in the third row, . . . ). Location information of each avatar is sorted based on the preset sorting rule and attribute information of the avatar, to obtain a location order table. Current location information of the cat avatar in the location order table is: the first column in the third row. Location information of an avatar of an original audience at the first column in the third row is changed into the second column in the third row through sorting.

When an audience is added to the live room, each avatar to be presented in the virtual scene is sorted, so that the avatar in the target live room can be presented based on an arrangement order obtained based on attribute information, thereby improving user experience.

Step 108: Render and present the target live room based on the location information of each avatar in the virtual scene and the virtual scene information.

Specifically, the target live room is rendered and presented based on the location information of each avatar in the virtual scene, avatar information corresponding to each avatar, and the virtual scene information.

In an actual application, the user can adjust the virtual scene information of the target live room based on a requirement, and specifically, a method for rendering and presenting the target live room based on the location information of each avatar in the virtual scene and the virtual scene information includes:

receiving a virtual scene modification instruction sent by the user, and modifying the virtual scene information based on the virtual scene modification instruction, to obtain to-be-presented virtual scene information; and rendering and presenting the target live room based on the location information of each avatar in the virtual scene and the to-be-presented virtual scene information.

The virtual scene modification instruction is an instruction for modifying the virtual scene information. The to-be-presented virtual scene information is virtual scene information obtained by modifying the virtual scene information based on the virtual scene modification instruction.

In a specific implementation of this application, for example, default virtual scene information of the live room is a concert scene. The virtual scene modification instruction is generated based on an operation that the user adjusts the virtual scene to a competition scene. The concert scene of the live room is changed to the competition scene based on the virtual scene modification instruction, and the live room is rendered and presented based on the location information and the avatar information of each avatar in the live room and competition scene information.

The virtual scene modification instruction is received, and the virtual scene information is modified, so that the user can select a background of the virtual scene corresponding to the live room, thereby improving personalized experience of the user.

In the livestreaming process, the target live room may be rendered and presented based on preset virtual scene special effect information. A specific method includes:

receiving the preset virtual scene special effect information, and rendering and presenting the target live room based on the preset virtual scene special effect information.

The preset virtual scene special effect information is preset information for presenting a special effect in the virtual scene. For example, special effect information such as stage fireworks and lights may be preset for a virtual concert scene. The preset virtual scene special effect information may be triggered by the online streamer of the target live room, or a time point may be preset to send the preset virtual scene special effect information to a client in which an audience in the target live room is located, so that the client renders and presents the target live room based on the preset virtual scene special effect information.

In a specific implementation of this application, a virtual competition scene is used as an example. An instruction that is sent by the online streamer of the target live room and that indicates that livestreaming is about to end is obtained (to-be-ended voice of the online streamer is recognized, the online streamer triggers a to-be-ended button, or the like, which is not specifically limited), it is obtained that virtual scene special effect information of the virtual competition scene is podium information, and the target live room is rendered and presented based on the podium information.

In an actual application, to improve an interaction effect between a virtual audience and the target live room, the user can perform an operation of interacting with the live room, for example, sending an interaction bullet-screen comment to the target live room or giving a gift to the online streamer, so as to improve user experience, and reduce a distance between online interaction and offline interaction. After the user sends the bullet-screen comment to the live room, the bullet-screen comment is presented above the avatar corresponding to the user, or after the user gives the gift to the online streamer of the target live room, the avatar corresponding to the user can present an action, for example, jumping, a gift special effect may be presented above the avatar, or the like, so as to improve user experience.

A method for presenting the interaction effect between the user and both of the live room and the online streamer specifically includes:

receiving live interaction information sent by the user, and determining interactive avatar information based on the live interaction information; and rendering and presenting the target live room based on the interactive avatar information.

The live interaction information is information about interaction between the audience in the live room and the live room. The interactive avatar information is presentation information corresponding to the live interaction information. For example, the live interaction information is generated based on an operation that a user of a puppy avatar gives a gift, and corresponding interactive avatar information is presentation information indicating that the puppy avatar jumps up.

Specifically, in the livestreaming process, the avatar information corresponding to the user may be adjusted based on information about the bullet-screen comment sent by the user and information about the given gift. For example, the user gives a gift, information about the gift appears at the head of the avatar, or the avatar jumps up once for highlighting. A manner of adjusting the avatar is not specifically limited in this application.

In a specific implementation of this application, for example, a user 2 gives a shell gift. The live room interaction information is generated based on the operation that the user 2 gives the shell gift to the online streamer. It is determined, based on the live room interaction information, that the interactive avatar information is that the shell gift is presented above an avatar of the user 2. The target live room is rendered and presented based on the interactive avatar information, so that the shell gift is presented above the avatar of the user 2.

In an actual application, to increase enjoyment and an interaction effect of the live room, the audience or the online streamer of the target live room can enable a live room virtual game, for example, play a monster fighting game or a PK game in the live room, so that the audience watching the target live room can participate in the game.

A method for the audience in the target live room to participate in the live room game specifically includes:

receiving a live room game operation instruction when the live room game is enabled; and determining game effect information based on the live room game operation instruction, and rendering and presenting the target live room based on the game effect information.

The live room game operation instruction is an instruction for operating an ongoing game in the live room, for example, an instruction for controlling the avatar corresponding to the user to attack a specified target object. The game effect information is information about a game effect presented in the live room after the user triggers a game operation.

In a specific implementation of this application, for example, the online streamer enables a monster fighting game. The client receives a start instruction indicating that the online streamer enables the monster fighting game, and the user can choose whether to participate in the monster fighting game. After the user participating in the monster fighting game starts the game, the user can fight a monster by giving a gift to the online streamer. To be specific, the client receives the live room game operation instruction generated based on the operation that the user gives the gift, determines monster fighting effect information based on the live room game operation instruction after the gift is given, and renders and presents the target live room based on the determined monster fighting effect information.

The target live room is rendered and presented based on the game effect information, so that the user participating in the live room game can see a game effect in real time. This enhances interaction between the audience and the live room, improves watching experience of the user, and enhances enjoyment of the live room.

According to the live room presentation method in this application, the live room entry instruction sent by the user is received, and the target live room and the target avatar information of the user are determined based on the live room entry instruction, so that a transmission connection is established between the client and the target live room in the server. This facilitates subsequent mutual transmission of live data. The virtual scene information and the virtual audience information of the target live room are obtained, to determine a presentation case of the virtual scene of the current target live room. The location information of each avatar in the virtual scene is determined based on the target avatar information and the virtual audience information, to determine how to present each avatar in the target live room. The target live room is rendered and presented based on the location information of each avatar in the virtual scene and the virtual scene information, so that an avatar corresponding to a user who newly enters the target live room and an existing avatar in the target live room are presented in the virtual scene of the target live room.

Figure 2:
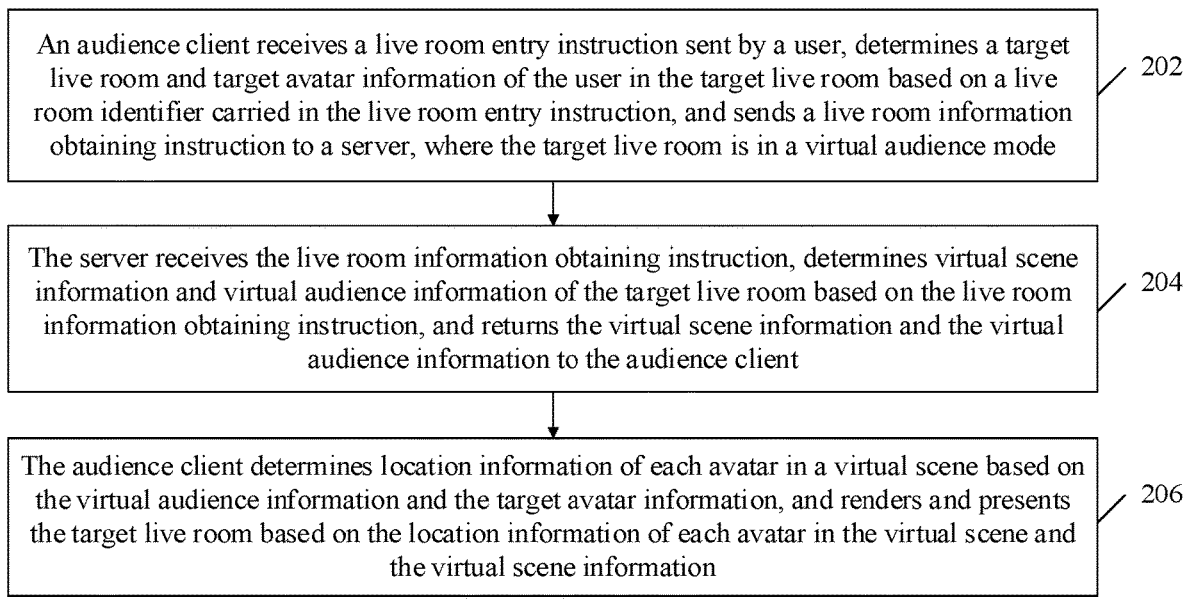
FIG. 2 is a flowchart of a second live room presentation method according to an embodiment of this application.

FIG. 2 is a flowchart of a second live room presentation method according to an embodiment of this application. The method is applied to a live room presentation system, where the live room presentation system includes an audience client and a server. The method specifically includes the following steps:

Step 202: The audience client receives a live room entry instruction sent by a user, determines a target live room and target avatar information of the user in the target live room based on a live room identifier carried in the live room entry instruction, and sends a live room information obtaining instruction to the server, where the target live room is in a virtual audience mode.

Specifically, the audience client is a client used by the user to watch the target live room, the server is a server that processes data related to a live room, and the live room presentation system may include a plurality of audience clients and the server. After receiving the live room entry instruction generated based on an operation that the user watches the live room, the audience client obtains the live room identifier in the live room entry instruction, determines the target live room based on the live room identifier, obtains the target avatar information of the user in the target live room, and sends the live room information obtaining instruction for obtaining information about the target live room to the server.

In a specific implementation of this application, for example, a singing live room. An audience client controlled by a user A receives a live room entry instruction generated based on an operation that the user A clicks a cover of the singing live room, determines the singing live room based on a live room identifier in the live room entry instruction, and obtains avatar information of the user A in the singing live room. After the singing live room is determined, the audience client generates singing live room information obtaining instruction, and sends the singing live room information obtaining instruction to the server. In this embodiment, a virtual audience mode of the singing live room is enabled by an online streamer.

Step 204: The server receives the live room information obtaining instruction, determines virtual scene information and virtual audience information of the target live room based on the live room information obtaining instruction, and returns the virtual scene information and the virtual audience information to the audience client.

Specifically, the server includes a database that stores live room information. After the server receives the live room information obtaining instruction, live room information of the target live room is obtained from the live room database of the server, where the live room information includes the virtual scene information and the virtual audience information of the target live room. The obtained virtual scene information and virtual audience information are returned to the audience client.

In a specific implementation of this application, the foregoing example is still used. The server receives the live room information obtaining instruction for obtaining live room information of the singing live room, determines, based on the live room information obtaining instruction, a database that stores the live room information of the singing live room, obtains current virtual scene information and virtual audience information of the singing live room from the database, that is, stage scene information, and location information and image information of each current avatar in the singing live room, and returns the obtained live room information of the singing live room to the audience client in which the user A is located.

Step 206: The audience client determines location information of each avatar in a virtual scene based on the virtual audience information and the target avatar information, and renders and presents the target live room based on the location information of each avatar in the virtual scene and the virtual scene information.

Specifically, the audience client sorts, according to a preset sorting policy, an avatar corresponding to the target avatar information and an avatar corresponding to the virtual audience information. For example, the audience client performs sorting based on a descending order of membership levels of users, determines location information of a target avatar in the virtual scene and sorted location information of another avatar in the virtual scene after the target avatar is added, and renders and presents the target live room based on the determined location information and image information of the avatars.

In a specific implementation of this application, the foregoing example is still used. The audience client in which the user A is located determines, based on target avatar information of the user A and the virtual audience information returned by the server, location information of a target avatar in a virtual scene corresponding to the singing live room, and location information of an avatar corresponding to each user entering the singing live room before the user A in the virtual scene after the target avatar is added.

In an actual application, the live room presentation system further includes an online streamer client. Specifically, before the audience client receives the live room entry instruction, determines the target live room and the target avatar information based on the live room identifier carried in the live room entry instruction, and sends the live room information obtaining instruction to the server, the method further includes:

The online streamer client receives a virtual audience mode enable instruction for the target live room, and adjusts the target live room to the virtual audience mode based on the virtual audience mode enable instruction.

The online streamer client is a client that initiates livestreaming. In a livestreaming process of an online streamer, the online streamer can choose whether to enable the virtual audience mode. If this mode is not selected, the live room is a normal live room. If this mode is selected, the live room is in the virtual scene mode. Specifically, whether to enable the virtual audience mode can be chosen based on an actual requirement.

The online streamer client can further generate, based on an image and an action of the online streamer, a virtual online streamer to be presented in the virtual scene of the live room, so as to implement interaction between a virtual audience and the virtual online streamer in the virtual scene, thereby improving a sense of immersion of an audience. Specifically, a method for converting the image of the online streamer into an avatar is not specifically limited in this application. The online streamer can alternatively select a pre-designed avatar as an image in the virtual scene. In addition, whether the online streamer is presented in the virtual scene in an avatar manner can be set by the online streamer. When no virtual online streamer is set, a live picture of the online streamer can be presented in the virtual scene.

In a specific implementation of this application, a dancing live room is used as an example. An online streamer client receives a virtual audience mode enable instruction, and enables a virtual audience mode of the dancing live room based on the virtual audience mode enable instruction.

In an actual application, to enhance a sense of immersion of the user in the live room, a virtual scene special effect may be preset. A specific implementation method includes:

The server sends preset virtual scene special effect information to the audience client; and
the audience client renders and presents the target live room based on the preset virtual scene special effect information.

Specifically, the preset virtual scene special effect information may be determined based on different live scene types. For example, when the virtual scene is of a concert type, the preset virtual scene special effect information may be stage fireworks information or stage lights information. That the server sends the preset virtual scene special effect information to the client may be that the server automatically sends the preset virtual scene special effect information to the client at a preset time point, or may be that the server sends the preset virtual scene special effect information to the client when the user of the client triggers a special effect button, provided that the preset virtual scene special effect information can be presented based on a requirement. This is not specifically limited in this application.

In an actual application, to increase interaction between the user and the online streamer, the user watching livestreaming can further participate in a live room game. A specific method includes:

The server receives a live room game operation instruction, and forwards the live room game operation instruction to the audience client; and
the audience client presents a game effect corresponding to the live room game operation instruction.

Specifically, the live room game operation instruction is received on a premise that the live room game is enabled. The live room game may be enabled by the online streamer of the live room, or may be enabled by the user watching livestreaming. This is not specifically limited herein. The server forwards the live room game operation instruction to the audience client. If the live room game is enabled by the user, the live room game operation instruction may be forwarded to the online streamer client, and the audience client determines and presents the game effect corresponding to the live room game operation instruction. For example, a corresponding launch effect is determined based on a launch operation instruction, and the audience client presents the launch effect in a game.

In an actual application, to more obviously present an interaction operation of an audience in the live room in the virtual scene and improve interaction, an interactive avatar may be presented in the virtual scene. A specific method includes:

The server receives live interaction information, and determines interactive avatar information based on the live interaction information; and
the audience client receives the interactive avatar information, and renders and presents the target live room based on the interactive avatar information.

Specifically, the server receives the live interaction information generated by the audience client based on an interaction operation with the live room, determines the interactive avatar information corresponding to the live interaction information, and presents the interactive avatar information in the audience client. For example, the user sends a bullet-screen comment to the live room to generate the live interaction information, it is determined, based on the live interaction information, that the corresponding interactive avatar information is action information indicating that the avatar speaks, and an action that the avatar speaks is presented in the audience client.

According to the live room presentation method applied to the live room presentation system in this application, the virtual online streamer and the virtual audience are presented in the virtual scene. This enhances a sense of immersion when the user watches livestreaming. The audience interacts with the live room in different forms. This improves user experience, a sense of participation, and an interaction atmosphere of the live room when the user watches livestreaming.

Figure 3:
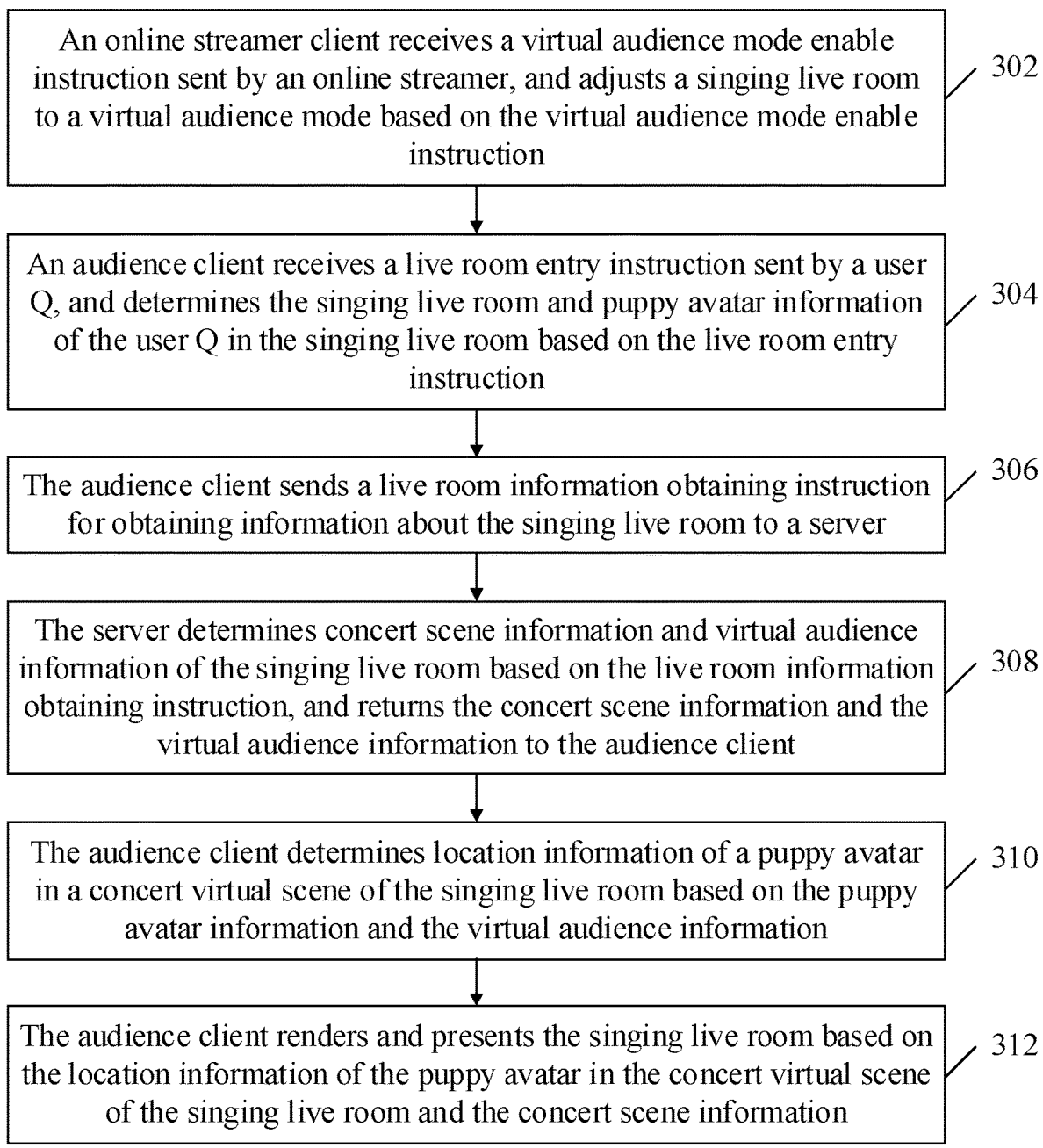
FIG. 3 is a processing flowchart of a live room presentation method applied to a singing live room according to an embodiment of this application.

Refer to FIG. 3. The following further describes the live room presentation method by using an example in which the live room presentation method provided in this application is applied to a singing live room. FIG. 3 is a processing flowchart of a live room presentation method applied to a singing live room according to an embodiment of this application. The method specifically includes the following steps:

Step 302: An online streamer client receives a virtual audience mode enable instruction sent by an online streamer, and adjusts the singing live room to a virtual audience mode based on the virtual audience mode enable instruction.

Step 304: An audience client receives a live room entry instruction sent by a user Q, and determines the singing live room and puppy avatar information of the user Q in the singing live room based on the live room entry instruction.

Step 306: The audience client sends a live room information obtaining instruction for obtaining information about the singing live room to a server.

Step 308: The server determines concert scene information and virtual audience information of the singing live room based on the live room information obtaining instruction, and returns the concert scene information and the virtual audience information to the audience client.

Step 310: The audience client determines location information of a puppy avatar in a concert virtual scene of the singing live room based on the puppy avatar information and the virtual audience information.

Specifically, the puppy avatar and an avatar corresponding to the virtual audience information are sorted based on levels of audiences, and the location information of the puppy avatar and location information of the avatar corresponding to the virtual audience information in the concert virtual scene are determined.

Step 312: The audience client renders and presents the singing live room based on the location information of the puppy avatar in the concert virtual scene of the singing live room and the concert scene information.

Specifically, the audience client renders the singing live room based on the location information of the puppy avatar in the concert virtual scene, avatar information of the puppy avatar, and the concert scene information, and presents the concert virtual scene that includes the puppy avatar.

According to the live room presentation method in this embodiment, the virtual audience mode is enabled, and after the user Q enters the singing live room, the puppy avatar information of the user Q that is presented in the live room is obtained. This improves user experience when the user enters the live room. Based on the puppy avatar information and the virtual audience information of a current audience in the live room when the user Q enters the singing live room, current location information of each user in the live room is determined after the user Q enters the live room. This enhances a sense of immersion of the user.

Figure 4:
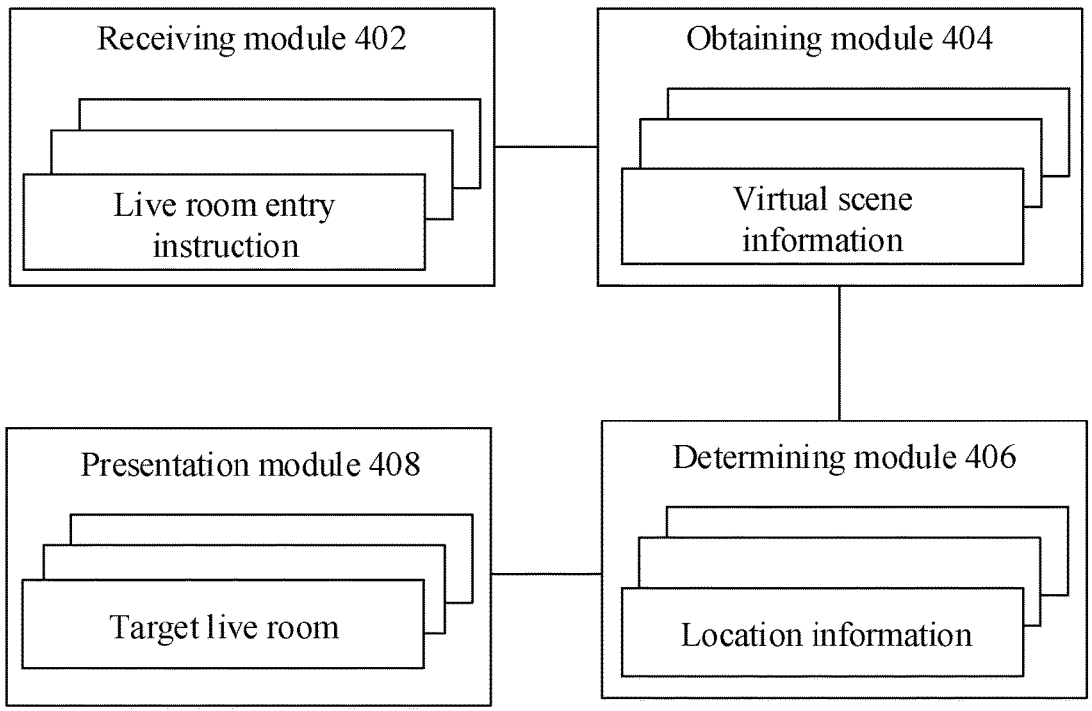
FIG. 4 is a schematic diagram of a structure of a live room presentation apparatus applied to an audience client according to an embodiment of this application.

Corresponding to the foregoing method embodiments, this application further provides an embodiment of a live room presentation apparatus applied to an audience client. FIG. 4 is a schematic diagram of a structure of a live room presentation apparatus applied to an audience client according to an embodiment of this application. As shown in FIG. 4, the apparatus includes:

a receiving module 402, configured to: receive a live room entry instruction sent by a user, and determine a target live room and target avatar information of the user based on the live room entry instruction, where the target live room is in a virtual audience mode;

an obtaining module 404, configured to obtain virtual scene information and virtual audience information of the target live room;

a determining module 406, configured to determine location information of each avatar in a virtual scene based on the target avatar information and the virtual audience information; and a presentation module 408, configured to render and present the target live room based on the location information of each avatar in the virtual scene and the virtual scene information.

Optionally, the receiving module 402 is further configured to:
  obtain a live room identifier carried in the live room entry instruction, and determine the target live room based on the live room identifier; and
  obtain the target avatar information of the user in the target live room.

Optionally, the receiving module 402 is further configured to:
  obtain initial avatar information of the user;
  receive an avatar information adjustment instruction for the initial avatar information; and
  adjust the initial avatar information based on the avatar information adjustment instruction to obtain the target avatar information, where the target avatar information includes a plurality of pieces of body image information.

Optionally, the obtaining module 404 is further configured to:
  generate a live room information obtaining instruction based on the live room entry instruction, and send the live room information obtaining instruction to a server; and
  receive the virtual scene information and the virtual audience information that are of the target live room and that are returned by the server in response to the live room information obtaining instruction.

Optionally, the determining module 406 is further configured to:
  determine a preset sorting rule; and
  obtain the location information of each avatar in the virtual scene based on the preset sorting rule, the target avatar information, and the virtual audience information.

Optionally, the determining module 406 is further configured to:
  sort target location information and audience location information based on the preset sorting rule, target attribute information, and audience attribute information, to obtain a location order table, where the location order table includes current target location information and current audience location information; and
  determine the location information of each avatar in the virtual scene based on the current target location information and the current audience location information.

Optionally, the presentation module 408 is further configured to:
  receive a virtual scene modification instruction sent by the user, and modify the virtual scene information based on the virtual scene modification instruction, to obtain to-be-presented virtual scene information; and
  render and present the target live room based on the location information of each avatar in the virtual scene and the to-be-presented virtual scene information.

The apparatus further includes a special effect module, configured to:
  receive preset virtual scene special effect information, and render and present the target live room based on the preset virtual scene special effect information.

The apparatus further includes an interaction module, configured to:

receive live interaction information sent by the user, and determine interactive avatar information based on the live interaction information; and render and present the target live room based on the interactive avatar information.

The apparatus further includes a game module, configured to:

receive a live room game operation instruction when a live room game is enabled; and determine game effect information based on the live room game operation instruction, and render and present the target live room based on the game effect information.

In the live room presentation apparatus applied to the audience client in this application, the receiving module receives the live room entry instruction sent by the user, and determines the target live room and the target avatar information of the user based on the live room entry instruction, where the target live room is in the virtual audience mode; the obtaining module obtains the virtual scene information and the virtual audience information of the target live room; the determining module determines the location information of each avatar in the virtual scene based on the target avatar information and the virtual audience information; and the presentation module renders and presents the target live room based on the location information of each avatar in the virtual scene and the virtual scene information. By receiving the live room entry instruction, the avatar corresponding to the user entering the live room is presented in the virtual scene of the live room. This enhances senses of participation and immersion of the user.

Figure 5:
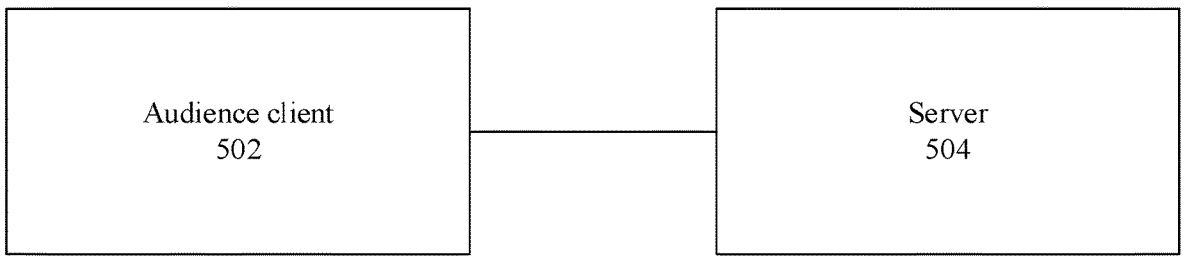
FIG. 5 is a schematic diagram of a structure of a live room presentation system according to an embodiment of this application.

Corresponding to the foregoing method embodiments, this application further provides an embodiment of a live room presentation system. FIG. 5 is a schematic diagram of a structure of a live room presentation system according to an embodiment of this application. As shown in FIG. 5, the system includes:

an audience client 502, configured to: receive a live room entry instruction sent by a user, determine a target live room and target avatar information of the user in the target live room based on a live room identifier carried in the live room entry instruction, and send a live room information obtaining instruction to a server 504, where the target live room is in a virtual audience mode; and a server 504, configured to: receive the live room information obtaining instruction, determine virtual scene information and virtual audience information of the target live room based on the live room information obtaining instruction, and return the virtual scene information and the virtual audience information to the audience client 502.

The audience client 502 is configured to: determine location information of each avatar in a virtual scene based on the virtual audience information and the target avatar information, and render and present the target live room based on the location information of each avatar in the virtual scene and the virtual scene information.

Optionally, the live room presentation system includes an online streamer client. The online streamer client is configured to: receive a virtual audience mode enable instruction for the target live room, and adjust the target live room to the virtual audience mode based on the virtual audience mode enable instruction.

Optionally, the server 504 is further configured to send preset virtual scene special effect information to the audience client.

The audience client 502 is further configured to render and present the target live room based on the preset virtual scene special effect information.

Optionally, the server 504 is further configured to receive a live room game operation instruction and forward the live room game operation instruction to the audience client.

The audience client 502 is further configured to present a game effect corresponding to the live room game operation instruction.

Optionally, the server 504 is further configured to: receive live interaction information, and determine interactive avatar information based on the live interaction information.

The audience client 502 is further configured to: receive the interactive avatar information, and render and present the target live room based on the interactive avatar information.

The foregoing is a schematic solution of the live room presentation system according to this embodiment. It should be noted that the technical solution of the live room presentation apparatus and the technical solution of the live room presentation method belong to a same concept. For details not described in detail in the technical solution of the live room presentation apparatus, refer to the descriptions of the technical solution of the live room presentation method.

Figure 6:
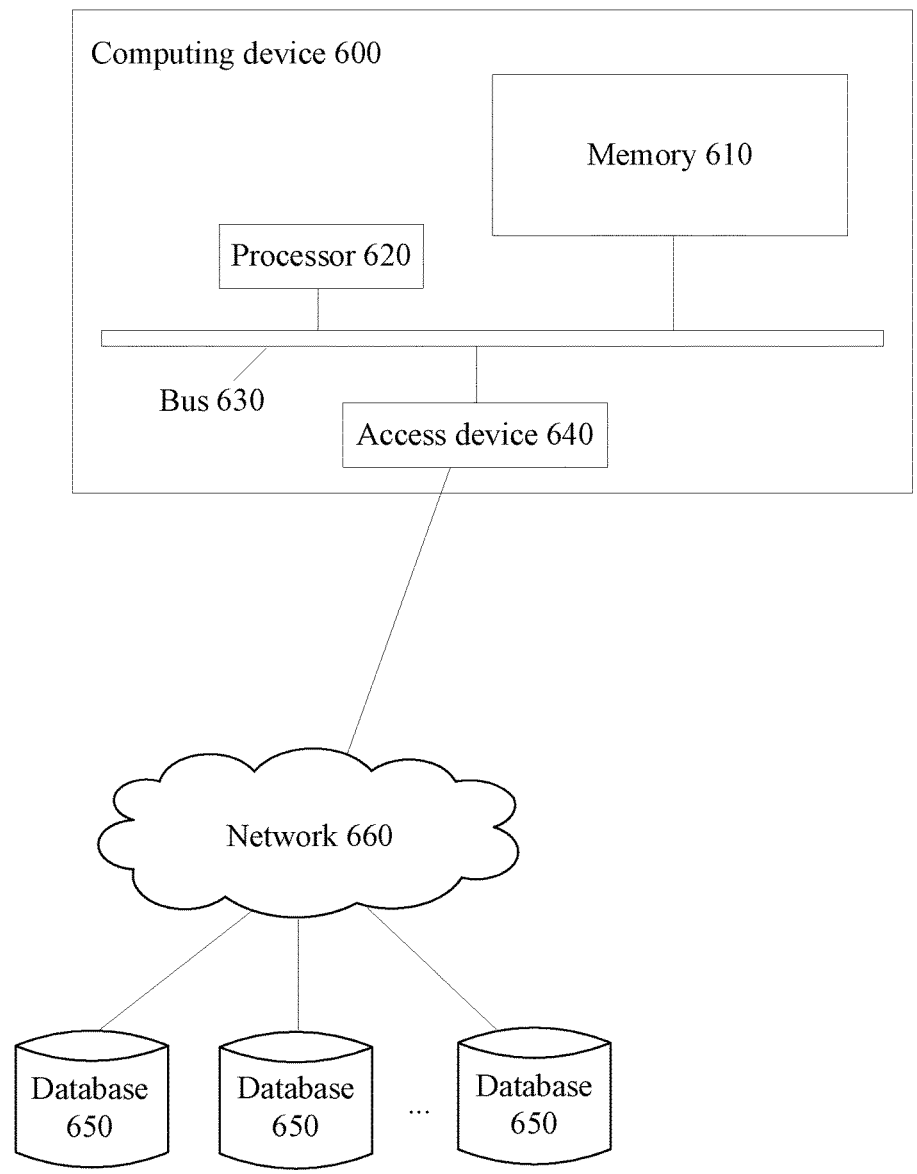
FIG. 6 is a block diagram of a structure of a computing device according to an embodiment of this application.

FIG. 6 is a block diagram of a structure of a computing device 600 according to an embodiment of this application. Components of the computing device 600 include but are not limited to a memory 610 and a processor 620. The processor 620 and the memory 610 are connected by using a bus 630, and a database 650 is configured to store data.

The computing device 600 further includes an access device 640. The access device 640 enables the computing device 600 to communicate by using one or more networks 660. Examples of these networks include a public switched telephone network (PSTN), a local area network (LAN), a wide area network (WAN), a private area network (PAN), or a combination of communication networks such as the Internet. The access device 640 may include one or more of any type of network interface (for example, a network interface card (NIC)) that is wired or wireless, for example, an IEEE 802.11 wireless local area network (WLAN) wireless interface, a global microwave interconnection access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 600 and other components not shown in FIG. 6 may be alternatively connected to each other, for example, by using the bus. It should be understood that the block diagram of the structure of the computing device shown in FIG. 6 is merely used as an example instead of a limitation on the scope of this application. A person skilled in the art may add or replace other components as required.

The computing device 600 may be any type of still or mobile computing device, including: a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses); another type of mobile device; or a still computing device, for example, a desktop computer or a PC. The computing device 600 may alternatively be a mobile or still server.

The processor 620 implements the steps of the live room presentation method when executing computer instructions.

The foregoing is a schematic solution of the computing device according to this embodiment. It should be noted that the technical solution of the computing device and the technical solution of the live room presentation method belong to a same concept. For details not described in detail in the technical solution of the computing device, refer to the descriptions of the technical solution of the live room presentation method.

An embodiment of this application further provides a computer-readable storage medium, where the computer-readable storage medium stores computer instructions, and when the computer instructions are executed by a processor, the steps of the live room presentation method are implemented.

The foregoing is a schematic solution of the computer-readable storage medium according to this embodiment. It should be noted that the technical solution of the storage medium and the technical solution of the live room presentation method belong to a same concept. For details not described in detail in the technical solution of the storage medium, refer to the descriptions of the technical solution of the live room presentation method.

Specific embodiments of this application are described above. Other embodiments fall within the scope of the appended claims. In some cases, the actions or steps recorded in the claims can be performed in an order different from the order in embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this specification are all preferred embodiments, and involved actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. These embodiments are selected and specifically described in this application to better explain the principle and the actual applications of this application, so that a person skilled in the art can better understand and use this application. This application is only subjected to the claims and the scope and equivalents thereof.

What is claimed is:

1. A live room presentation method, applied to an audience client computing device, comprising:

receiving an instruction of entering a live room by the audience client computing device associated with a user;

determining target avatar information associated with the user and a target live room based on the instruction, wherein the target live room is in a virtual audience mode, wherein the target avatar information comprises target attribute information and target location information;

establishing a transmission connection between the audience client computing device and the target live room in a server to facilitate subsequent transmission of live data;

obtaining virtual scene information and virtual audience information associated with the target live room, wherein the virtual audience information comprises audience attribute information and audience location information;

determining location information of each avatar corresponding to each user associated with the target live room in a virtual scene based on the target avatar information and the virtual audience information;

rendering and presenting the target live room based on the location information of each avatar in the virtual scene and the virtual scene information;

wherein the live room presentation method further comprises:

generating a location order table by sorting the target location information and the audience location information based on a preset sorting rule, the target attribute information, and the audience attribute information, wherein the location order table comprises current target location information and current audience location information; and determining the location information of each avatar in the virtual scene based on the current target location information and the current audience location information.

2. The live room presentation method according to claim 1, wherein the determining target avatar information associated with the user and a target live room based on the instruction further comprises:

obtaining a live room identifier carried in the instruction, and determining the target live room based on the live room identifier; and obtaining the target avatar information associated with the user in the target live room.

3. The live room presentation method according to claim 2, wherein the obtaining the target avatar information associated with the user in the target live room further comprises:

obtaining initial avatar information associated with the user;

receiving an avatar information adjustment instruction for adjusting the initial avatar information; and adjusting the initial avatar information based on the avatar information adjustment instruction to obtain the target avatar information, wherein the target avatar information comprises a plurality of pieces of body image information.

4. The live room presentation method according to claim 1, wherein the obtaining virtual scene information and virtual audience information associated with the target live room further comprises:
   generating an instruction of obtaining live room information based on the instruction of entering the live room, and sending the instruction of obtaining live room information to the server; and
   receiving the virtual scene information and the virtual audience information associated with the target live room and returned by the server.

5. The live room presentation method according to claim 1, wherein the determining location information of each avatar corresponding to each user associated with the target live room in a virtual scene based on the target avatar information and the virtual audience information further comprises:
   determining the preset sorting rule; and
   determining the location information of each avatar in the virtual scene based on the preset sorting rule, the target avatar information, and the virtual audience information.

6. The live room presentation method according to claim 1, wherein the rendering and presenting the target live room based on the location information of each avatar in the virtual scene and the virtual scene information further comprises:
   receiving a virtual scene modification instruction from the user, and modifying the virtual scene information based on the virtual scene modification instruction to obtain to-be-presented virtual scene information; and
   rendering and presenting the target live room based on the location information of each avatar in the virtual scene and the to-be-presented virtual scene information.

7. The live room presentation method according to claim 1, further comprising:
   receiving preset virtual scene special effect information, the preset virtual scene special effect information indicating one or more special effects to be presented in the virtual scene; and
   rendering and presenting the target live room based on the preset virtual scene special effect information.

8. The live room presentation method according to claim 1, further comprising:
   receiving live interaction information sent by the user, and determining interactive avatar information based on the live interaction information; and
   rendering and presenting the target live room based on the interactive avatar information.

9. The live room presentation method according to claim 1, further comprising:
   receiving a live room game operation instruction, the live room game operation instruction comprising information indicative of one or more game effects;
   determining the information indicative of one or more game effects based on the live room game operation instruction; and
   rendering and presenting the one or more game effects in the target live room based on the information indicative of one or more game effects.

10. A computing device, comprising:
    at least one processor; and
    at least one memory communicatively coupled to the at least one processor and comprising computer-readable instructions that upon execution by the at least one processor cause the at least one processor to perform operations comprising:
    receiving an instruction of entering a live room by an audience client computing device associated with a user;
    determining target avatar information associated with the user and a target live room based on the instruction, wherein the target live room is in a virtual audience mode, wherein the target avatar information comprises target attribute information and target location information;
    establishing a transmission connection between the audience client computing device and the target live room in a server to facilitate subsequent transmission of live data;
    obtaining virtual scene information and virtual audience information associated with the target live room, wherein the virtual audience information comprises audience attribute information and audience location information;
    determining location information of each avatar corresponding to each user associated with the target live room in a virtual scene based on the target avatar information and the virtual audience information;
    rendering and presenting the target live room based on the location information of each avatar in the virtual scene and the virtual scene information;
    wherein the operations further comprise:
    generating a location order table by sorting the target location information and the audience location information based on a preset sorting rule, the target attribute information, and the audience attribute information, wherein the location order table comprises current target location information and current audience location information; and
    determining the location information of each avatar in the virtual scene based on the current target location information and the current audience location information.

11. The computing device according to claim 10, wherein the determining target avatar information associated with the user and a target live room based on the instruction further comprises:
    obtaining a live room identifier carried in the instruction, and determining the target live room based on the live room identifier; and
    obtaining the target avatar information associated with the user in the target live room.

12. The computing device according to claim 10, wherein the obtaining virtual scene information and virtual audience information associated with the target live room further comprises:
    generating an instruction of obtaining live room information based on the instruction of entering the live room, and sending the instruction of obtaining live room information to the server; and
    receiving the virtual scene information and the virtual audience information associated with the target live room and returned by the server.

13. The computing device according to claim 10, wherein the determining location information of each avatar corresponding to each user associated with the target live room in a virtual scene based on the target avatar information and the virtual audience information further comprises:
    determining the preset sorting rule; and determining the location information of each avatar in the virtual scene based on the preset sorting rule, the target avatar information, and the virtual audience information.

14. The computing device according to claim 10, wherein the rendering and presenting the target live room based on the location information of each avatar in the virtual scene and the virtual scene information further comprises:
receiving a virtual scene modification instruction from the user, and modifying the virtual scene information based on the virtual scene modification instruction to obtain to-be-presented virtual scene information; and
rendering and presenting the target live room based on the location information of each avatar in the virtual scene and the to-be-presented virtual scene information.

15. The computing device according to claim 10, the operations further comprising:
receiving preset virtual scene special effect information indicating one or more special effects to be presented in the virtual scene; receiving live interaction information sent by the user and determining interactive avatar information based on the live interaction information; or receiving a live room game operation instruction comprising information indicative of one or more game effects; and
rendering and presenting the target live room based on the preset virtual scene special effect information, the interactive avatar information, or the information indicative of one or more game effects.

16. A non-transitory computer-readable storage medium, storing computer-readable instructions that upon execution by a processor cause the processor to implement operations comprising:
receiving an instruction of entering a live room by an audience client computing device associated with a user;
determining target avatar information associated with the user and a target live room based on the instruction, wherein the target live room is in a virtual audience mode, wherein the target avatar information comprises target attribute information and target location information;
establishing a transmission connection between the audience client computing device and the target live room in a server to facilitate subsequent transmission of live data;
obtaining virtual scene information and virtual audience information associated with the target live room, wherein the virtual audience information comprises audience attribute information and audience location information;
determining location information of each avatar corresponding to each user associated with the target live room in a virtual scene based on the target avatar information and the virtual audience information;
rendering and presenting the target live room based on the location information of each avatar in the virtual scene and the virtual scene information;
wherein the operations further comprise:
generating a location order table by sorting the target location information and the audience location information based on a preset sorting rule, the target attribute information, and the audience attribute information, wherein the location order table comprises current target location information and current audience location information; and
determining the location information of each avatar in the virtual scene based on the current target location information and the current audience location information.

17. The non-transitory computer-readable storage medium according to claim 16, wherein the determining location information of each avatar corresponding to each user associated with the target live room in a virtual scene based on the target avatar information and the virtual audience information further comprises:
determining the preset sorting rule; and
determining the location information of each avatar in the virtual scene based on the preset sorting rule, the target avatar information, and the virtual audience information.

18. The non-transitory computer-readable storage medium according to claim 16, wherein the rendering and presenting the target live room based on the location information of each avatar in the virtual scene and the virtual scene information further comprises:
receiving a virtual scene modification instruction from the user, and modifying the virtual scene information based on the virtual scene modification instruction to obtain to-be-presented virtual scene information; and
rendering and presenting the target live room based on the location information of each avatar in the virtual scene and the to-be-presented virtual scene information.

19. The non-transitory computer-readable storage medium according to claim 16, the operations further comprising:
receiving preset virtual scene special effect information, the preset virtual scene special effect information indicating one or more special effects to be presented in the virtual scene; and
rendering and presenting the target live room based on the preset virtual scene special effect information.

20. The non-transitory computer-readable storage medium according to claim 16, the operations further comprising:
receiving live interaction information sent by the user, and determining interactive avatar information based on the live interaction information; and
rendering and presenting the target live room based on the interactive avatar information.

* * * * *